Sept. 5, 1944.   A. NUTT   2,357,606
ENGINE PRE-OILING SYSTEM
Filed March 22, 1943
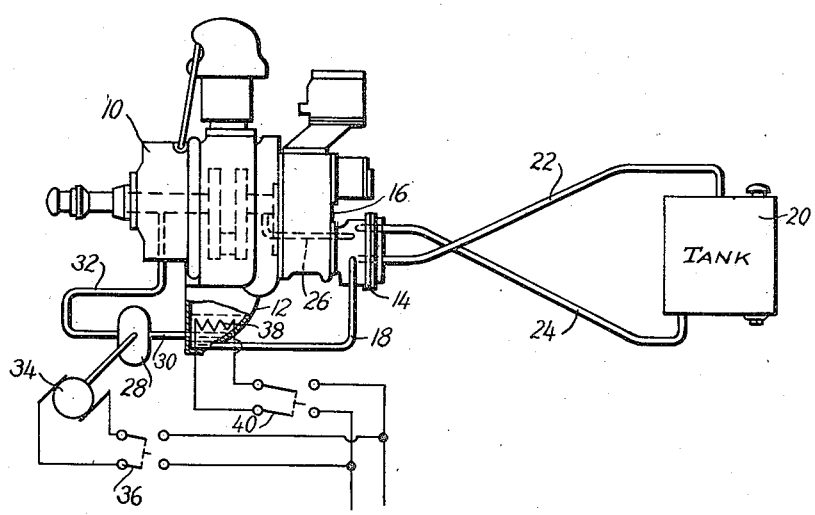
INVENTOR
*ARTHUR NUTT.*
BY
ATTORNEY Patented Sept. 5, 1944

2,357,606

UNITED STATES PATENT OFFICE 2,357,606

ENGINE PREOILING SYSTEM

Arthur Nutt, Montclair, N. J., assignor to Wright Aeronautical Corporation, a corporation of New York Application March 22, 1943, Serial No. 480,127

9 Claims. (Cl. 184—6)

This invention relates to lubrication systems for use in engines and particularly relates to the provision of means to pre-oil the engine before starting.

It is common practice to pre-oil an aircraft engine before starting in order that all bearing surfaces may be flood-lubricated at the instant of starting. In a radial type aircraft engine, if the pre-oiling system draws oil from the main supply reservoir, there is danger of pumping too much oil into the engine lubrication system before the engine is started. Such excess oil will overflow the engine sump into the lower cylinders and may result in damage to the engine parts upon starting the engine because of the resulting quantity of oil in the cylinder heads of these lower cylinders. Radial cylinder aircraft engines conventionally utilize a dry sump lubrication system so that there is normally only a small quantity of oil in the engine sump. It is an object of this invention to add an auxiliary oil pump to such a dry sump lubrication system which auxiliary pump is operable to draw oil from the sump to pre-oil the engine. With this construction, there is no danger of pumping too much oil into the engine before it is started because of the limited quantity of oil in the sump. Another feature of this invention is that since the quantity of oil in the sump is relatively small, this oil may be heated quite quickly. Accordingly, it is a further object of this invention to provide an electric heater for heating the oil in the sump before it is circulated through the engine lubrication system during the pre-oiling operation.

Other objects of this invention will become apparent in reading the annexed detailed description in connection with the drawing which schematically illustrates a radial cylinder aircraft engine employing a dry sump lubrication system and embodying this invention.

A conventional radial cylinder aircraft engine is illustrated at 10 and is provided with a so-called dry sump lubrication system having an oil sump 12 into which surplus oil drains from within the engine. An engine driven oil pump unit 14 is secured to the rear accessory section of the engine and this unit contains an oil pressure pump and a scavenging pump. During engine operation the scavenging pump removes oil from the sump 12 through a line 18 and delivers this oil to a supply reservoir 20 through a line 22 while the oil pressure pump draws the oil from the reservoir 20 through a line 24 and delivers the oil through passages such as 26 to various parts of the engine. After the engine stops, the oil drains out of the bearings into the sump and the oil previously whirled around within the engine crankcase during engine operation settles down into the sump. The capacity of the scavenging pump is larger than that of the oil pressure pump so that the quantity of oil in the sump is relatively small. The above described engine lubrication system is quite conventional.

In order to pre-oil the engine an auxiliary pump 28 is provided which upon operation draws oil from the oil sump through line 30 and delivers this oil through passages such as 32 to the various parts of the engine lubrication system. This auxiliary pump is driven by electric motor 34 which is connected to a source of electric energy by a switch 36. With this construction the auxiliary pump 28 may be operated to pre-oil the engine, and since there is only a small quantity of oil in the sump 12, there is no danger of pumping too much oil into the engine. Also, the operation of the auxiliary pump 28 is entirely independent of the conventional engine driven lubrication system so that there is no possibility of the pre-oiling system interfering with the operation of the conventional oiling system.

Since the quantity of oil in the sump is quite small, it is readily possible to heat this oil before it is used to pre-oil the engine. For this purpose an electric heating element 38 is placed in heat exchange relation with the oil in the sump. This electric heating element is connected to a source of electric energy through a switch 40. Thus the pilot may quickly pre-heat the small quantity of oil in the sump before using the auxiliary pump 28 to pre-oil the engine.

If desired, signal lamps may be connected to the circuits for the heater 38 and the electric pump motor 34 to warn the pilot if he neglects to open these circuits. However, even though the engine is started while the pre-oiling pump is still running, no harm will result.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine lubrication system, an oil supply reservoir, an engine driven oil pressure pump operative to pump lubricating oil from said reservoir into said system, an engine sump, an engine driven scavenging pump operative to return oil from said sump to the supply reservoir, and an auxiliary oil pump operable independently of said engine for pumping lubricating oil from said sump into said system.

2. In an engine lubrication system, an oil supply reservoir, an engine driven oil pressure pump for pumping lubricating oil into said system from said reservoir, a sump for said engine, an engine driven scavenging pump for returning oil from the engine sump to the supply reservoir, and an electrically driven auxiliary pump operable to pump lubricating oil from said sump into said system.

3. In an engine having a pressure lubrication system, an oil supply reservoir, an engine sump, engine driven pump means for feeding lubricating oil from said supply reservoir into said system and for returning oil from said engine sump to said supply reservoir, and an electrically driven auxiliary pump operable to pump lubricating oil from said sump to said system.

4. In an engine lubrication system, an oil supply reservoir, an engine driven oil pressure pump connected to said reservoir for pumping lubricating oil into said system, an engine sump, an engine driven scavenging pump for returning oil from the engine sump to the supply reservoir, an auxiliary oil pump operable independently of said engine for pumping lubricating oil from said sump into said system, and means for heating the oil in the sump.

5. In combination with an engine having a dry-sump lubrication system, pump means operable independently of engine operation and operatively connected to the engine sump for feeding lubricating oil therefrom to said engine for engine lubrication.

6. In an engine lubrication system, an oil supply reservoir, an engine sump, engine driven pump means for feeding lubricating oil from said supply reservoir into said system and for returning oil from said engine sump to said supply reservoir, and means for feeding lubricating oil from said sump into said system independently of engine operation.

7. In an engine lubrication system, an oil supply reservoir, an engine sump, engine driven pump means for feeding lubricating oil from said supply reservoir into said system and for returning oil from said engine sump to said supply reservoir, and auxiliary pump means operable for feeding lubricating oil from said sump into said system.

8. In an engine lubrication system, an oil supply reservoir, an engine sump, engine driven pump means for feeding lubricating oil from said supply reservoir into said system and for returning oil from said engine sump to said supply reservoir, and auxiliary pump means operable when the engine is inoperative for feeding lubricating oil from said sump into said system.

9. In an engine lubrication system, an oil supply reservoir, an engine sump, engine driven pump means for feeding lubricating oil from said supply reservoir into said system and for returning oil from said engine sump to said supply reservoir, auxiliary pump means operable when the engine is inoperative for feeding lubricating oil from said sump into said system, and means operable independently of engine operation for heating the oil in said sump.

ARTHUR NUTT.